United States Patent
Seki (10) Patent No.: US 10,853,657 B2
(45) Date of Patent: Dec. 1, 2020

(54) OBJECT REGION IDENTIFYING APPARATUS, OBJECT REGION IDENTIFYING METHOD, AND COMPUTER PROGRAM PRODUCT

(71) Applicant: Kabushiki Kaisha Toshiba, Tokyo (JP)

(72) Inventor: Akihito Seki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 121 days.

(21) Appl. No.: 16/117,891

(22) Filed: Aug. 30, 2018

(65) Prior Publication Data

US 2019/0278998 A1  Sep. 12, 2019

(30) Foreign Application Priority Data

Mar. 6, 2018  (JP) .................... 2018-039979

(51) Int. Cl.
*G06K 9/00* (2006.01)
*G06K 9/62* (2006.01)

(52) U.S. Cl.
CPC ....... *G06K 9/00718* (2013.01); *G06K 9/6256* (2013.01); *G06K 9/6268* (2013.01)

(58) Field of Classification Search
CPC ........... G06K 9/00718; G06K 9/00442; G06K 9/00791; G06K 9/4628; G06K 9/6256; G06K 9/6268; G06T 7/00; G06T 7/0012; G06T 7/0014; G06T 2207/20192; H04N 19/20; H04N 19/80
See application file for complete search history.

(56) References Cited

U.S. PATENT DOCUMENTS 5,787,274 A * 7/1998 Agrawal ............... G06N 5/003
5,867,605 A * 2/1999 Oliveras ............... H04N 19/80
382/260

(Continued)

FOREIGN PATENT DOCUMENTS

JP   2008-217706 A   9/2008

OTHER PUBLICATIONS

Taylor et al. "Parsing Indoor Scene Using RGB-D Imagery" 2013 univercity of Pennsylvania, cjtalor.acowley@cis.upenn.edu.*

(Continued)

*Primary Examiner* — Jingge Wu
(74) *Attorney, Agent, or Firm* — Finnegan, Henderson, Farabow, Garrett & Dunner, L.L.P.

(57) ABSTRACT

An object region identifying apparatus according to an embodiment identifies to which one of a plurality of predetermined object classes each pixel of an image belongs to label the pixel with an object type. The object region identifying apparatus includes following units. A base cost calculating unit calculates base costs of the respective object classes in each of the pixels. A transition cost estimating unit estimates a transition cost accrued when a transition between the object classes occurs between adjacent pixels in the image. A cumulative cost calculating unit calculates cumulative costs of the respective object classes in each of the pixels by accumulating the base cost and the transition cost for the respective object classes along a scanning direction set on the image. A class determining unit determines the object class of each of the pixels based on the corresponding cumulative cost.

10 Claims, 10 Drawing Sheets

(56) References Cited

U.S. PATENT DOCUMENTS

| | | | | |
|---|---|---|---|---|
| 5,870,735 | A * | 2/1999 | Agrawal | G06N 5/003 |
| 6,363,319 | B1 * | 3/2002 | Hsu | H04L 45/00 |
| | | | | 701/533 |
| 6,366,684 | B1 * | 4/2002 | Gerard | G06T 7/0012 |
| | | | | 382/132 |
| 6,661,842 | B1 * | 12/2003 | Abousleman | H03M 13/41 |
| | | | | 348/398.1 |
| 2002/0041710 | A1 * | 4/2002 | Magarcy | G06K 9/342 |
| | | | | 382/173 |
| 2003/0088532 | A1 * | 5/2003 | Hampshire, II | G06K 9/6262 |
| | | | | 706/16 |
| 2007/0003138 | A1 * | 1/2007 | Hobson | G06T 7/12 |
| | | | | 382/173 |
| 2008/0170751 | A1 * | 7/2008 | Lei | G06T 7/215 |
| | | | | 382/103 |
| 2010/0045799 | A1 * | 2/2010 | Lei | G06K 9/00369 |
| | | | | 348/169 |
| 2011/0010312 | A1 * | 1/2011 | McDonald | G06Q 30/0283 |
| | | | | 705/400 |

OTHER PUBLICATIONS

V. Badrinarayanan et al., "SegNet: A Deep Convolutional Encoder-Decoder Architecture for Image Segmentation", IEEE Transactions on Pattern Analysis and Machine Intelligence, pp. 1-14 (2017).

S. Zheng et al., "Conditional Random Field as Recurrent Neural Networks", International Conference on Computer Vision, pp. 1-17 (2015).

H. Hirschmuller, "Stereo Processing by Semiglobal Matching and Mutual Information", IEEE Transactions on Pattern Analysis and Machine Intelligence, vol. 30, No. 2, pp. 328-341 (2008).

A. Seki et al., "SGM-Nets: Semi-Global Matching with Neural Networks", IEEE CVPR, pp. 231-240 (Jul. 2017).

* cited by examiner

OBJECT REGION IDENTIFYING APPARATUS, OBJECT REGION IDENTIFYING METHOD, AND COMPUTER PROGRAM PRODUCT

CROSS-REFERENCE TO RELATED APPLICATIONS

This application is based upon and claims the benefit of priority from Japanese Patent Application No. 2018-039979, filed on Mar. 6, 2018; the entire contents of which are incorporated herein by reference.

FIELD

Embodiments described herein relate generally to an object region identifying apparatus, an object region identifying method, and a computer program product.

BACKGROUND

Labelling each pixel of an image with an object type is referred to as semantic segmentation, and semantic segmentation has a wide range of applications. For example, in autonomous automobile driving, a course on which an automobile runs can be determined by identifying regions corresponding to an automobile, a road, and a pedestrian from a video received from an onboard camera. As another example, by identifying a region corresponding to a person from a video received from a surveillance camera, the information can be used in detecting a suspicious person or counting people. When the accuracy of the labelling in the semantic segmentation is increased, the reliability of the subsequent process will be also improved.

There is a widely known approach of semantic segmentation to independently acquire an object label of each pixel. However, because the object label does not change very much in increments of pixel, global information of the image can be used to improve the labelling accuracy, and therefore, an approach to determine the object label of each pixel using global information has also been proposed. However, the conventional method to determine the object label of each pixel using the global information acquires the object label for each pixel by repeating trial and errors based on relations between the pixel and those nearby, and is therefore required to perform repetitive computations in order to label the pixels at high accuracy. Thus, such an approach requires long computational time, disadvantageously, in particular, when the resolution of the image is high. Therefore, there is a demand for reducing the amount of computations required in achieving highly accurate labelling using global information.

DETAILED DESCRIPTION

An object region identifying apparatus according to an embodiment identifies to which one of a plurality of predetermined object classes each pixel of an image belongs to label the pixel with an object type. The object region identifying apparatus includes a base cost calculating unit, a transition cost estimating unit, a cumulative cost calculating unit and a class determining unit. The base cost calculating unit calculates base costs of the respective object classes in each of the pixels. The transition cost estimating unit estimates a transition cost accrued when a transition between the object classes occurs between adjacent pixels in the image. The cumulative cost calculating unit calculates cumulative costs of the respective object classes in each of the pixels by accumulating the base cost and the transition cost for the respective object classes along a scanning direction set on the image. The class determining unit determines the object class of each of the pixels based on the corresponding cumulative cost.

An object region identifying apparatus, an object region identifying method, and a computer program product according to an embodiment will now be explained in detail with reference to the appended drawings. In this embodiment, each pixel of an image is labelled with an object type by identifying to which one of a plurality of predetermined object classes the pixel belongs, and particularly, this embodiment proposes a new semantic segmentation approach to achieve highly accurate labelling using global information, with a less amount of computations.

An energy function of the semantic segmentation using global information can be expressed as following Expression (1).

$$E(\hat{C}) = \min_{C} \sum_{x} \left( U(x, c^x) + \sum_{y \in N_x} p(c^x, c^y) \right) \quad (1)$$

Where x is a pixel position in the image. y is a pixel position that is adjacent to x. $c^x$ is the object class c in the pixel position x, and $c^y$ is the object class c in the pixel position y. U is a cost assigned to each of the pixel positions x and each of the object classes c. p is a penalty accrued when the object class c changes (goes through a transition) between the pixel position x and the pixel position y. C represents the object class of the entire image, and the semantic segmentation using global information is a problem for acquiring $\hat{C}$ having the smallest energy, using Expression (1).

This approach determines, for each pixel position x, an object class c resulting in the lowest cost U in the first term of the right side of Expression (1) when the penalty p (sometimes referred to as a pairwise term) in the second term of the right side above is zero. This is the same as that in the semantic segmentation approach to independently acquire the object label of each pixel (e.g., the approach disclosed in Vijay Badrinarayanan et al., "SegNet: A Deep Convolutional Encoder-Decoder Architecture for Image Segmentation", IEEE Transactions on Pattern Analysis and Machine intelligence, 2017). In Expression (1), a drastic change in a label of each pixel is suppressed by adding the penalty p in the second term of the right side to the cost U in the first term of the right side.

With the conventional semantic segmentation approaches using global information (e.g., the approaches disclosed in Japanese Patent Application Laid-open No. 2008-217706 or that disclosed in Shuai Zheng et al., "Conditional Random Field as Recurrent Neural Networks", International Conference on Computer Vision, 2015.), in order to achieve highly accurate labelling by solving Expression (1), long computational time is required, because it is necessary to repeat the computations while updating $c^x$ (the object class c in the pixel position x) until the object class stabilizes. By contrast, in this embodiment, by introducing a concept of "cumulative cost", which will be described later, and approximately solving Expression (1) using the dynamic programming, the object class of each pixel of an image is determined by a single operation. With this approach, the computational time can be reduced greatly, compared with that required in the conventional approaches in which computations are repeated.

Figure 1:
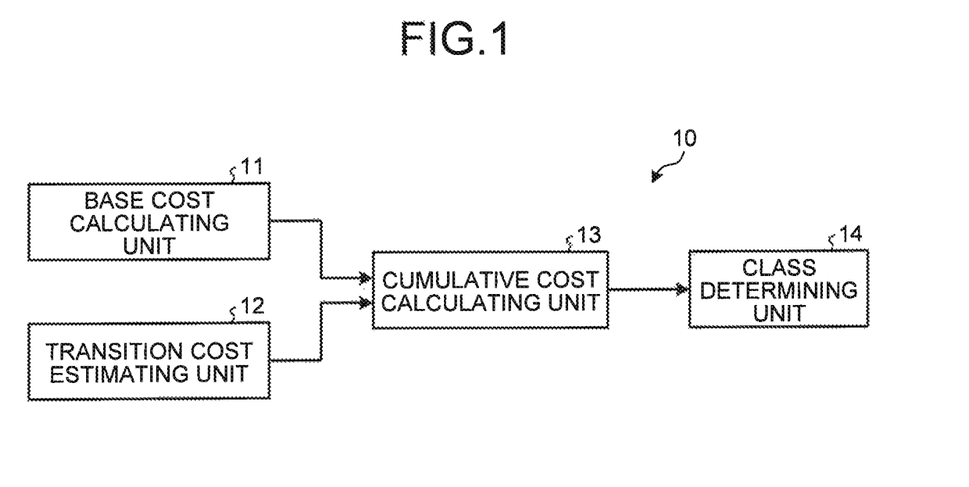
FIG. 1 is a block diagram illustrating an exemplary functional configuration of an object region identifying apparatus according to an embodiment.

FIG. 1 is a block diagram illustrating an exemplary functional configuration of an object region identifying apparatus 10 according to the embodiment. This object region identifying apparatus 10 includes, as illustrated in FIG. 1, a base cost calculating unit 11, a transition cost estimating unit 12, a cumulative cost calculating unit 13, and a class determining unit 14.

The base cost calculating unit 11 receives an input of an image to be processed, and calculates base costs for a plurality of respective object classes in each pixel of the image. The object classes are defined in advance, in a manner suitable for the application. As an example, for the application of autonomous driving, four object classes "automobile", "road", "pedestrian", and "others" are defined in advance. In the explanation hereunder, the example will be used as appropriate, but the embodiment is not limited to the application of autonomous driving.

The base cost calculated by the base cost calculating unit 11 corresponds to the cost U in Expression (1). The base cost calculating unit 11 may be implemented using the neural network (SegNet) disclosed by Badrinarayanan et al. (2017), for example. It should be noted that, because the neural network disclosed in Badrinarayanan et al. (2017) calculates a value s for each of the object classes and determines the object class having the highest value as the object class of the pixel, it is necessary to convert the value s calculated by the neural network according to Badrinarayanan et al. (2017) into a base cost U using following Expression (2).

$$U = 1 - s \quad (2)$$

In this example, the value s is converted into a base cost (J using Expression (2), assuming that the value s calculated by the neural network according to Badrinarayanan et al. (2017) has been normalized to 0 to 1 by applying a sigmoid function, for example. The way of implementing the conversion is, however, not limited this example, because the base cost calculating unit 11 is only required to calculate a base cost U having a value that becomes smaller when the object class is a true object class. The neural network disclosed in Badrinarayanan et al. (2017) is trained (has its network parameters updated) in advance using a large number of images, but an explanation of how the neural network is trained will be omitted herein.

The transition cost estimating unit 12 estimates a transition cost accrued when a transition between the object classes occurs between adjacent pixels in the image. The transition cost is 0 if a transition is between the same object class, and is a non-negative value if a transition is between different object classes. The value of the transition cost of the object classes is nearer to 0 as the transition between those object classes is easier. The transition cost estimated by the transition cost estimating unit 12 corresponds to the penalty p in Expression (i).

Figure 2:
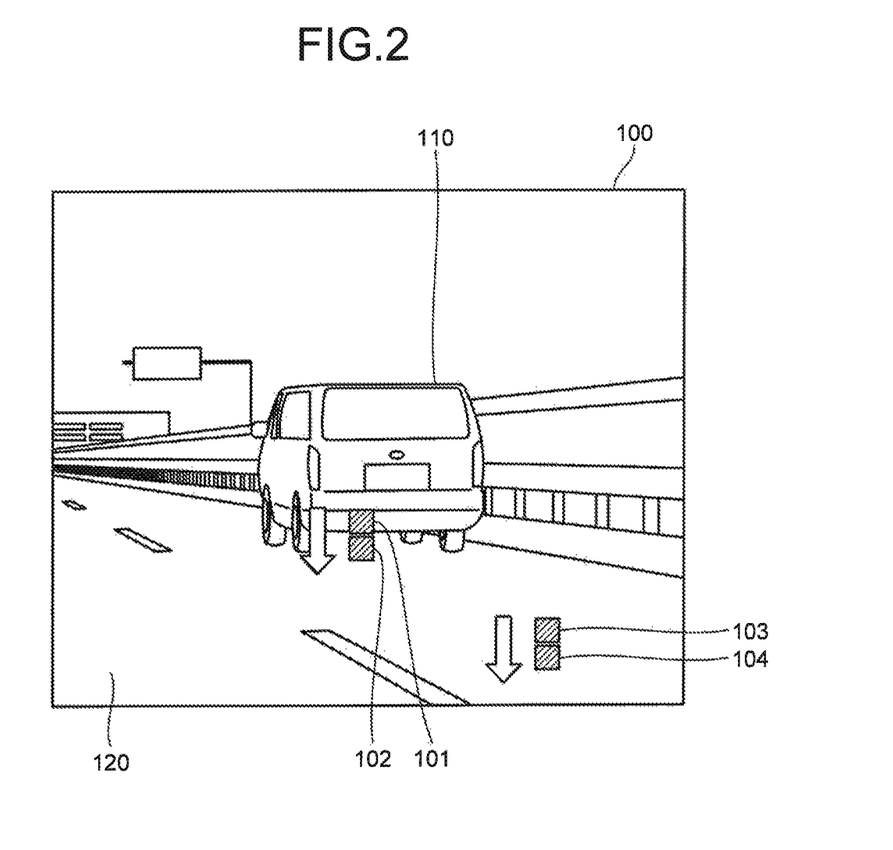
FIG. 2 is a schematic for briefly explaining a transition cost.

The transition cost will now be explained briefly using FIG. 2. Assumed herein is the application of the autonomous automobile driving, and the example in which four object classes "automobile", "road", "pedestrian", and "others" are defined as the object class. The exemplary image illustrated in FIG. 2 is an image 100 including an image of an automobile 110 running on a road 120. A pixel 101 belonging to the automobile 110 and a pixel 102 belonging to the road 120 are adjacent to each other at the positions illustrated in FIG. 2. For the purpose of the explanation, the pixel 101 and the pixel 102 are illustrated in a larger size in FIG. 2 than that of the actual pixel.

In the image 100 illustrated in FIG. 2, at the positions of the pixel 101 and the pixel 102, the true object class changes from "automobile" to "road" in a direction from the pixel 101 to the pixel 102. Therefore, it is preferable, in the direction from the pixel 101 to the pixel 102, for the transition cost estimating unit 12 to estimate a transition cost nearer to 0 if the transition is from "automobile" to "road", and to estimate a higher transition cost if the transition is between other object classes, e.g., if the transition is from "automobile" to "pedestrian" or from "others" to "automobile". In the image 100 illustrated in FIG. 2, at the positions of a pixel 103 and a pixel 104, because the pixel 103 and the pixel 104 both belong to the road 120, the transition cost estimating unit 12 estimates a higher transition cost when there is any transition in the object class, including a transition from the object class from "road" to another object class, so as to prevent any transition in the object class between the pixel 103 and the pixel 104.

The transition cost estimating unit 12 estimates the transition cost based on positions and a direction in the image to be processed. The transition cost estimating unit 12 is trained with training data in advance to estimate a transition cost in each of the pixels of the image to be processed in such a manner that a cumulative cost, which will be described later, is minimized for the true object class. The transition cost estimating unit 12 can be built as a neural network, for example. In such a case, through this preliminary training, the parameters of the neural network (the weight and the bias in each layer) are updated. A specific method for training the transition cost estimating unit 12 will be described later in detail.

The cumulative cost calculating unit 13 calculates cumulative costs of the respective object classes, in each pixel of the image to be processed, by calculating a sum of the base cost and the transition cost along a scanning direction that is set on the image to be processed. The class determining unit 14 determines the object class in each pixel of the image to be processed, based on the cumulative cost calculated by the cumulative cost calculating unit 13.

The object region identifying apparatus 10 according to the embodiment determines the object class in each pixel of the image to be processed by approximately solving Expression (1) using the dynamic programming. In other words, the dynamic programming is used in the processes in which the cumulative cost calculating unit 13 calculates the cumulative cost and the class determining unit 14 determines the object class.

The cumulative cost calculation and the object class determination using the dynamic programming will now be explained briefly. In this example, a pixel position moved back by one pixel from a pixel position A in a scanning direction set on the image is defined as a pixel position B. At this time, the cumulative cost calculating unit 13 adds the smallest combination of the transition cost and the cumulative cost in the pixel position B to base costs of the respective object classes in the pixel position A, and uses the results as the cumulative costs in the pixel position A. The cumulative cost calculating unit 13 repeats this operation while moving the pixel position A by one pixel at a time in the scanning direction, and calculates the cumulative cost corresponding to each of the object classes, for all pixels in the image. When a plurality of scanning directions are set on the image, the cumulative cost calculating unit 13 repeats the operation described above for each of the scanning directions, and calculates the sum of the cumulative costs calculated for the respective scanning directions, for each of the object classes, as an integrated cumulative cost. The object class having the lowest cumulative cost (or the lowest integrated cumulative cost, when there are a plurality of scanning directions) in each pixel of the image is determined as the object class of the pixel.

A known image processing technique that uses the dynamic programming is disclosed in H. Hirschmuller, "Stereo Processing by Semiglobal Matching and Mutual Information", IEEE Transactions on Pattern Analysis and Machine intelligence, 2008. The cumulative cost calculation and the object class determination using the dynamic programming described above can be implemented by applying the technique disclosed by Hirschmuller (2008), for example. However, because the technique disclosed by Hirschmuller (2008) relates to generation of a parallax image using stereo images, it is impossible to apply the disclosed technique as it is. Therefore, a new approach is formulized herein. A specific example of the cumulative cost calculation and the object class determination implemented by applying the technique disclosed by Hirschmuller (2008) will now be explained in detail.

Figure 3A:
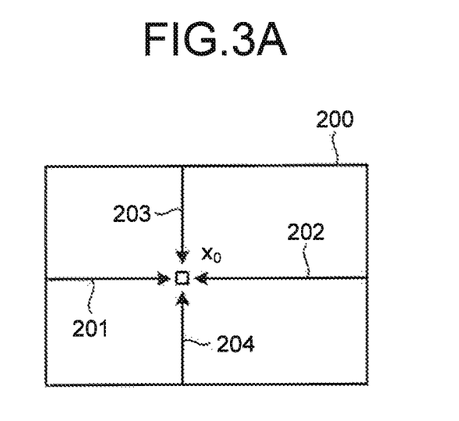
FIG. 3A is a schematic for explaining an example in which four scanning directions are set on an image.
Figure 3B:
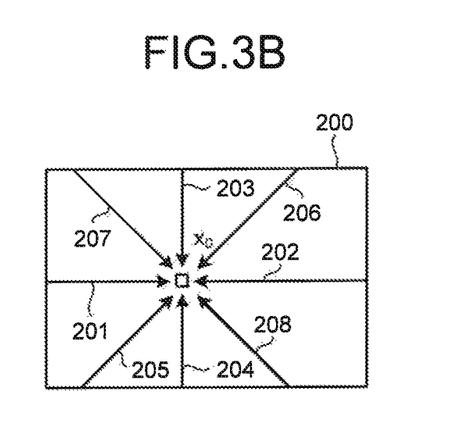
FIG. 3B is a schematic for explaining an example in which eight scanning directions are set on an image.

To begin with, a scanning direction is set on the image to be processed. The scanning direction may be set in plurality. When the number of scanning directions is greater, the accuracy of semantic segmentation labelling is improved, but the amount of computations is increased as well. Therefore, it is preferable to set an optimal number of scanning directions depending on the accuracy required in the application, and on the computation processing capability of the apparatus. FIG. 3A illustrates an example in which four scanning directions are set on an image 200. A scanning direction 201 directed horizontally from the left to the right, a scanning direction 202 directed horizontally from the right to the left, a scanning direction 203 directed vertically from the top to the bottom, and a scanning direction 204 directed vertically from the bottom to the top, all of which are directed toward the pixel position $x_0$, are set in this example. FIG. 3B illustrates an example in which eight scanning directions are set on the image 200. A scanning direction 205 directed from the lower left to the upper right at 45 degrees, a scanning direction 206 directed from the upper right to the lower left at 45 degrees, a scanning direction 207 directed from the upper left to the lower right at 45 degrees, and a scanning direction 208 directed from the lower right to the upper left at 45 degrees, all of which are directed toward the pixel position $x_0$, are set in addition to the four scanning directions illustrated in FIG. 3A.

The cumulative cost calculating unit 13 then calculates a cumulative cost in each pixel of the image to be processed, along each of the scanning directions set on the image. Because the same process is performed for each of the scanning directions, the explanation of the process below focuses on one scanning direction.

Figure 4:
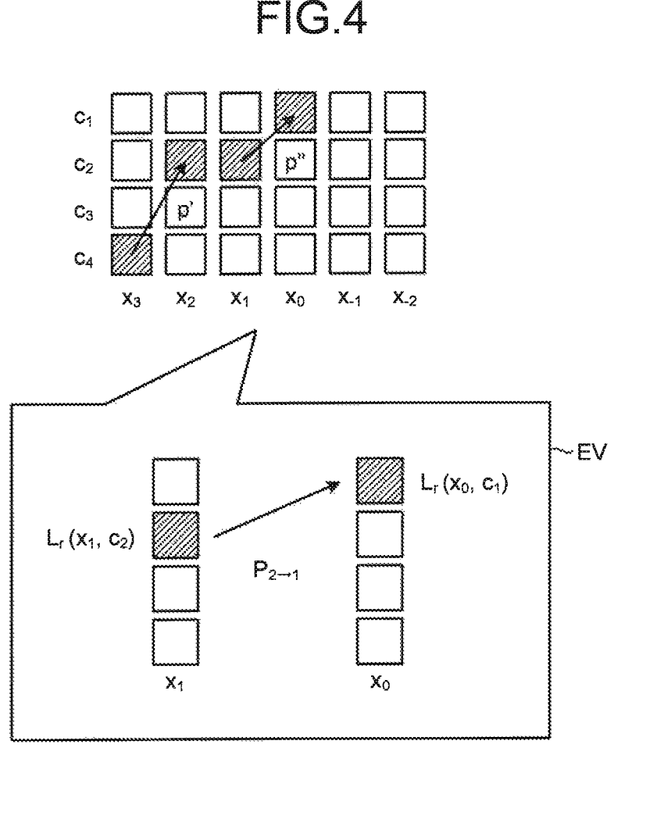
FIG. 4 is a schematic for explaining a process of computing a cumulative cost.

FIG. 4 is a schematic for explaining the process of computing a cumulative cost toward the pixel position $x_0$. The horizontal axis in FIG. 4 represents pixel positions, and the vertical axis represents object classes. The pixel position $x_n$ represents a pixel position moved back by n pixels from the pixel position $x_0$ in the scanning direction. The number of object classes is fixed, and in this example, it is assumed that there are four object classes $c_1$ to $c_4$ (automobile, road, pedestrian, and others). In the example illustrated in FIG. 4, the object class changes between the pixel position $x_3$ and the pixel position $x_2$, and between the pixel position $x_1$ and the pixel position $x_0$, and transition costs p', p'' are accrued, respectively. EV in FIG. 4 is an enlargement of the section between the pixel position $x_1$ and the pixel position $x_0$. $P_{2 \to 1}$ is a transition cost of a transition from the object class $c_2$ to the object class $c_1$.

The cumulative cost calculating unit 13 calculates a cumulative cost $L_r$ of each of the object classes c, in each of the pixels of the image, along each of the scanning direction r, based on following Expression (3). Following Expression (3) is an expression for acquiring the cumulative cost $L_r(x_0, c_k)$ of the object class $c_k$ in the pixel position $x_0$.

$$L_r(x_0, c_k) = U(x_0, c_k) + \min\left(L_r(x_1, c_k), \min_{i \in c}(L_r(x_1, c_i) + P_{i \to k}(x_1))\right) \quad (3)$$

where $U(x_0, c_k)$ is a base cost of the object class $c_k$ in the pixel position $x_0$, $L_r(x_1, c_k)$ is a cumulative cost of the object class $c_k$ in the pixel position $x_1$, $L_r(x_1, c_i)$ is a cumulative cost of the object class $c_i$ in the pixel position $x_1$, and $P_{i \to k}(x_1)$ is the transition cost accrued when a transition from the object class $c_i$ to $c_k$ occurs between the pixel position $x_1$ and the pixel position $x_0$.

As indicated in Expression (3), the cumulative cost calculating unit 13 acquires a cumulative cost in each pixel of the image, for each of the scanning directions, by adding a cumulative cost in a pixel position moved back by one pixel from the pixel in the scanning direction to the base cost of that pixel position, the cumulative cost being that of the object class found to be the lowest through a comparison of the cumulative costs and the transition costs. The cumulative cost calculating unit 13 calculates the cumulative costs of the respective object classes, in each of the pixels of the image, by sequentially adding the cumulative cost to the base cost along the scanning direction set on the image.

With this computation method, however, there is a concern that the value of the cumulative cost may overflow, depending on the processing capability of the apparatus, because the sum of the cumulative costs in the adjacent pixels is calculated along the scanning direction. In such a case, it is possible to subtract the lowest cumulative cost in the pixel position moved back by one pixel in the scanning direction from the cumulative cost in the current pixel position, and to use the resultant $L_r'$ instead of $L_r$, as indicated in following Expression (4).

$$L_r'(x_0, c_k) = L_r(x_0, c_k) - \min_{i \in c} L_r(x_1, c_i) \qquad (4)$$

Because the process of acquiring the cumulative cost for one scanning direction does not interact with those for the other scanning directions, the processes may be performed in parallel for the respective scanning directions. Furthermore, because this process for one pixel position does not interfere with those for the other pixel positions, the processes may also be performed in parallel for the respective pixel positions. When four scanning directions are set, as illustrated in FIG. 3A, the cumulative cost can be calculated in parallel for the respective scanning directions 201 to 204, and for example, the cumulative cost in the scanning direction 201 can be calculated in parallel for the number of pixels in the vertical direction of the image 200.

The cumulative cost calculating unit 13 then calculates the sum of the cumulative costs $L_r$ calculated for the respective scanning directions, in the manner described above, in accordance with Expression (5) below, and acquires the integrated cumulative cost L of each of the object classes, in each of the pixels of the image. Expression (5) below is an expression for acquiring the integrated cumulative cost $L(x_0, c_k)$ of the object class $c_k$ in the pixel position $x_0$. If only one scanning direction is set on the image, the integrated cumulative cost L is equal to the cumulative cost $L_r$.

$$L_r(x_0, c_k) = \sum_{r \in r} L_r(x_0, c_k) \qquad (5)$$

Once the cumulative cost calculating unit 13 acquires the integrated cumulative cost L of each of the object classes, the class determining unit 14 selects the object class having the smallest integrated cumulative cost L in each of the pixels of the image, in accordance with Expression (6) below, and determines the selected object class as the object class of that pixel. Expression (6) below is an expression for determining the object class $c^{x_0}$ in the pixel position $x_0$.

$$c^{x_0} = \arg\min_{k \in c} L(x_0, c_k) \qquad (6)$$

By determining the object class in each of the pixels of the image to be processed in the manner described above, each pixel of the image is labelled with an object type. For example, in the example of the autonomous driving described above, each pixel of the image to be processed is labelled with one of the object labels "automobile", "road", "pedestrian", and "others", so that these object regions of the image are identified.

Figure 5:
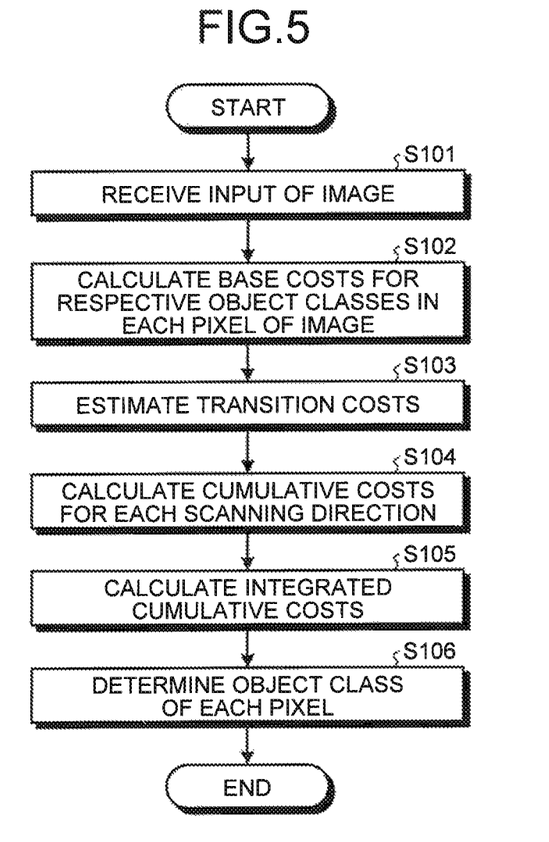
FIG. 5 is a flowchart illustrating the sequence of a process performed by the object region identifying apparatus according to the embodiment.

FIG. 5 is a flowchart illustrating the sequence of a process performed by the object region identifying apparatus 10 according to the embodiment. Because the specific process performed at each of the steps illustrated in FIG. 5 are as described above, detailed explanations thereof will be omitted as appropriate.

Upon receiving an input of an image to be processed (Step S101), the base cost calculating unit 11 calculates, to begin with, the base costs for a plurality of respective predetermined object classes, in each pixel of the image input at Step S101 (Step S102).

The transition cost estimating unit 12 then estimates a transition cost accrued when a transition between the object classes occurs between adjacent pixels in the image input at Step S101 (Step S103).

The cumulative cost calculating unit 13 then calculates cumulative costs of the respective object classes, in each of pixels, for each of the scanning directions set on the image input at Step S101 (Step S104). The cumulative cost calculating unit 13 then calculates an integrated cumulative cost by calculating the sum of the cumulative costs calculated for the respective scanning directions at Step S104 (Step S1051.

The class determining unit 14 then determines, for each of the pixels of the image input at Step S101, the object class having the lowest integrated cumulative cost, calculated at Step S105, as the object class of that pixel, among the object classes (Step S106).

As explained above, to implement the semantic segmentation using global information, the object region identifying apparatus 10 according to the embodiment calculates the cumulative costs of the respective object classes, in each of the pixels in accordance with Expression (3), for each of the scanning directions set on the image to be processed. When the scanning direction is set in plurality, the object region identifying apparatus 10 then calculates an integrated cumulative cost by calculating the sum of the cumulative costs for the respective scanning directions. The object region identifying apparatus 10 then determines, for each of the pixels of the image, the object class having the lowest integrated cumulative cost (the cumulative cost, when the number of scanning direction is one), as the object class of that pixel. Therefore, the object class of each pixel can be determined by one operation, without repeating computations as required in the conventional technique, and highly accurate labelling using global information can be achieved, with a less amount of computations.

Figure 6:
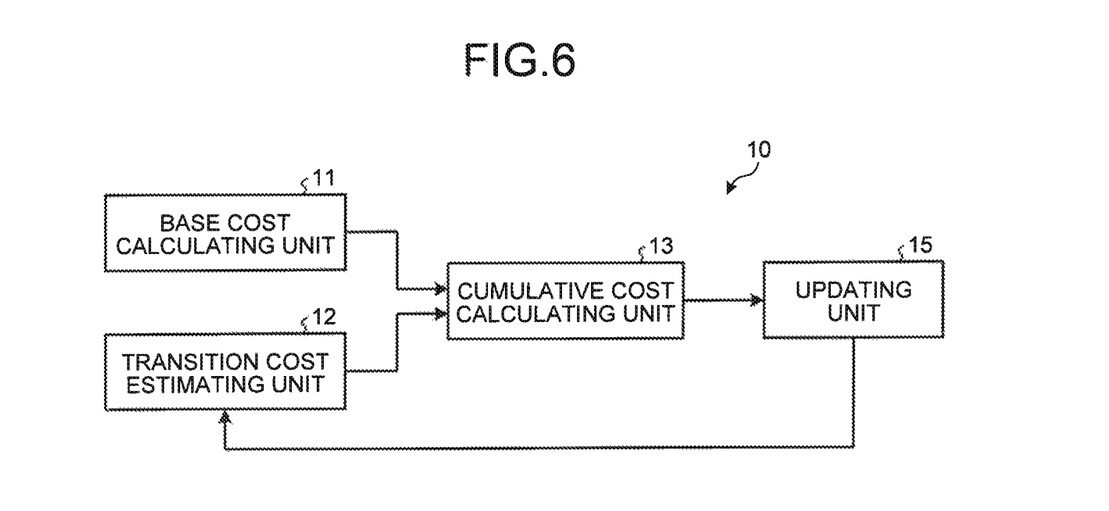
FIG. 6 is a block diagram illustrating an exemplary configuration by which a transition cost estimating unit is trained.

A specific method for training the transition cost estimating unit 12 will now be explained, assuming an example in which the transition cost estimating unit 12 for estimating the transition cost is implemented as a neural network. While the transition cost estimating unit 12 is being trained, an updating unit 15 is provided, instead of the class determining unit 14, as illustrated in FIG. 6, and the output of the cumulative cost calculating unit 13 is input to the updating unit 15. The updating unit 15 trains the transition cost estimating unit 12 (updates the network parameters of the neural network) in such a manner that the outputs of the cumulative cost calculating unit 13 are brought nearer to teaching data.

Figure 7:
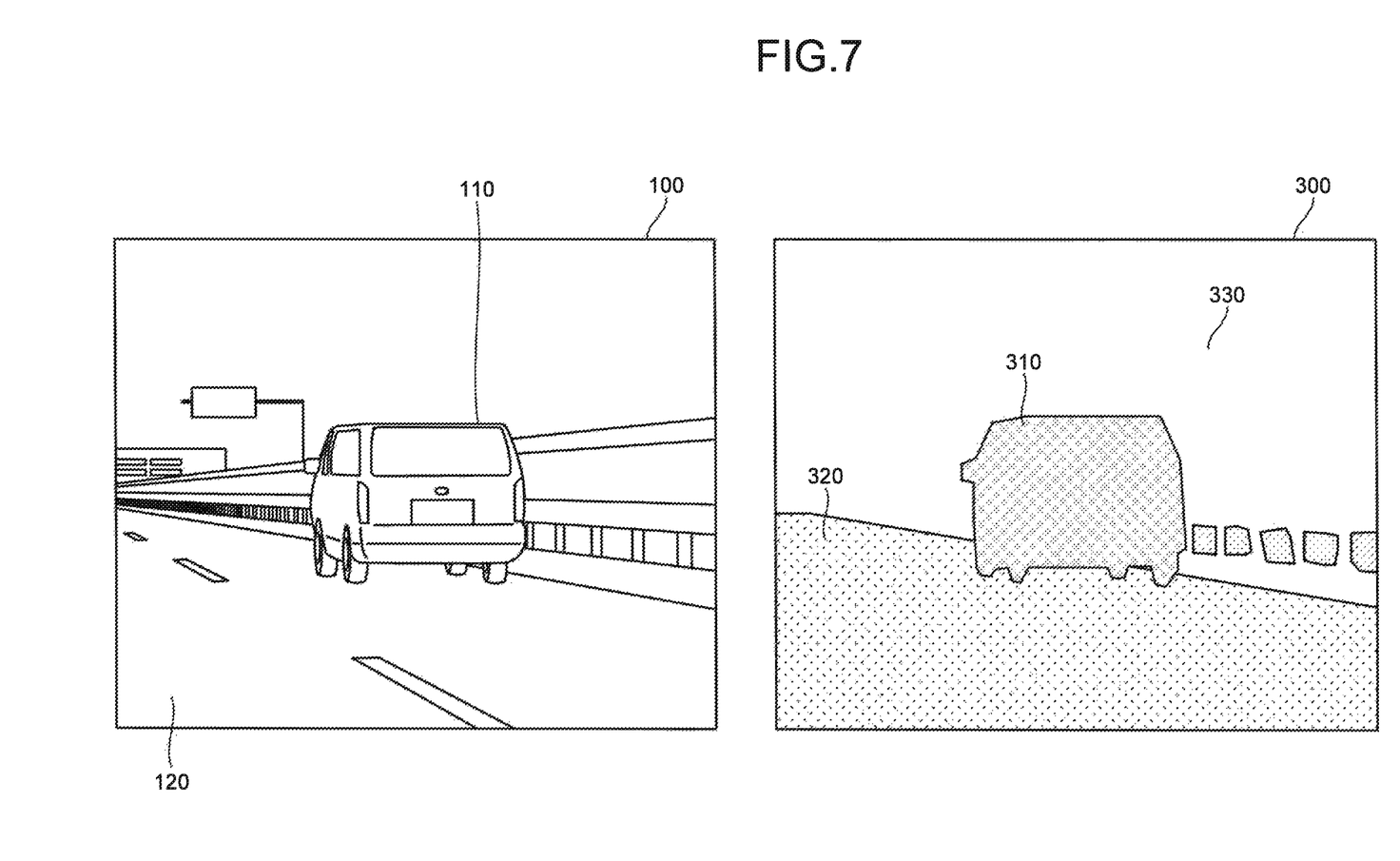
FIG. 7 is a schematic illustrating one example of training data.

The teaching data is a piece of data indicating correct labelling results corresponding to the image. A combination of an image and teaching data makes up the training data. One example of training data is illustrated in FIG. 7. The exemplary training data illustrated in FIG. 7 includes the exemplary image 100 illustrated in FIG. 2, and teaching data 300 corresponding to the image 100. The teaching data 300 indicates that the object label "automobile" is given to the pixels in a region 310 including the automobile 110 in the image 100, that the object label "road" is given to the pixels of a region 320 including the road 120 in the image 100, and that the object label "others" is given to the pixels in the remaining region 330. In order to allow the updating unit 15 to train the transition cost estimating unit 12 appropriately, a large number of pieces of training data is required.

There are two types of the transition cost estimating unit 12: one of which is a type that estimates a fixed transition cost for the entire image in the direction in which the pixels are adjacent; and the other of which is a type that estimates a varying transition cost depending on the pattern around a pixel position of a pixel of interest. If the transition cost estimating unit 12 is of the former type, because the transition cost to be estimated is fixed, any positive value may be set. As a guideline for deciding the transition cost, the transition cost may be decided based on the number of object labels included in the teaching data. In other words, it is possible to create a histogram of how often transitions between the object classes occur between adjacent pixels, and to assign a relatively lower transition cost to a transition that occurs more frequently, and to assign a relatively higher transition cost to a transition that occurs less frequently. In this manner, the transition cost estimating unit 12 of the former type can be easily trained in advance.

However, in practice, different transition costs should be assigned depending on the image patterns. For example, the pixels 103, 104 in the image example illustrated in FIG. 2 exhibit typical image patterns of a road. In such a case, a higher transition cost should be assigned to a transition that is least likely to occur, e.g., a transition from an automobile to a pedestrian. The transition cost estimating unit 12 of the latter type is intended to address such a demand, and can be implemented using a neural network, for example.

A specific method for training the transition cost estimating unit 12 of the latter type will now be explained. To train the transition cost estimating unit 12, the training of the transition cost estimating unit 12 described below is repeated using a large number of pieces of training data.

The transition cost estimating unit 12 can be trained by applying the technique disclosed in Akihito Seki and Marc Pollefeys, "SGM-Nets: Semi-global matching with neural networks", IEEE CVPR, July, 2017, for example. However, because the technique disclosed by Seki & Pollefeys (2017) relates to generation of a parallax image using stereo images, it is impossible to apply the disclosed technique as it is. Therefore, a new approach is formulized herein. In this example, to begin with, a pixel position for which the transition cost is updated is selected in plurality. A first loss and a second loss are then calculated using these pixel positions. The transition cost estimating unit 12 is then trained based on the first loss and the second loss.

Figure 8:
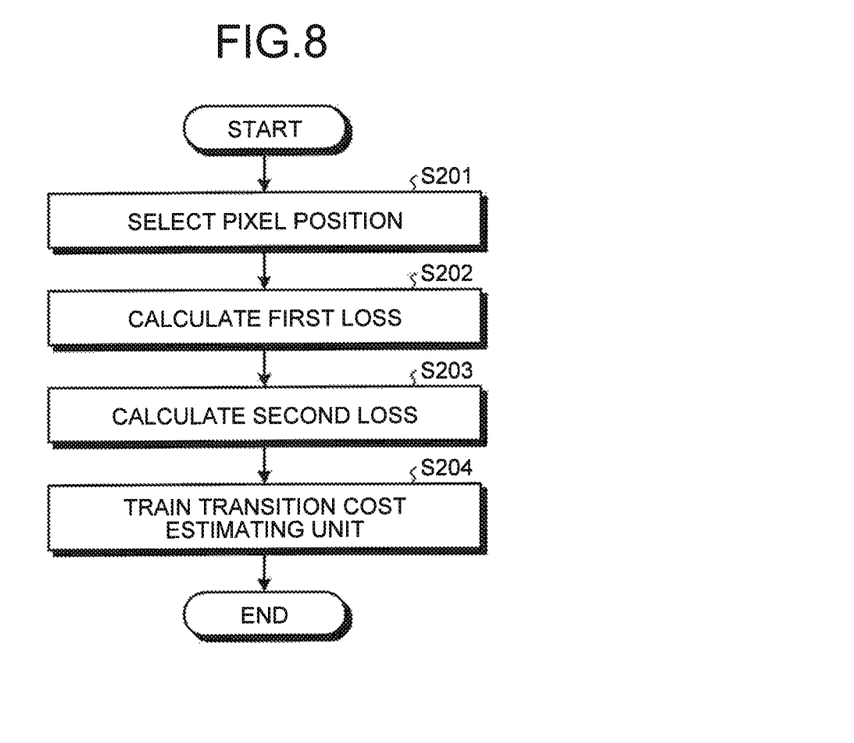
FIG. 8 is a flowchart illustrating the sequence of a process of training the transition cost estimating unit.

FIG. 8 is a flowchart illustrating the sequence of a process of training the transition cost estimating unit 12. A specific method for training the transition cost estimating unit 12 will now be explained in detail, following this flowchart.

At Step S201, a pixel position for which the transition cost is updated is selected in plurality from an image. The pixel positions in the entire image may be selected as the pixel positions, but in view of training the transition cost estimating unit 12 at a feasible computational speed, it is sufficient if some of the pixel positions are selected discretely from the image.

At Step S202, the first loss is calculated. Because the transition cost estimating unit 12 is built as a neural network, a derivative required in the back propagation of errors, which is a training method generally used, is also acquired.

The first loss can be calculated based on Expression (7) below. Expression (7) is an expression for acquiring the first loss $H_1(x_0, r)$ corresponding to the scanning direction r, in the pixel position $x_0$.

$$H_1(x_0, r) = \sum_{c_i^{x_0} \neq c_{gt}^{x_0}} \max(0, L_r(x_0, c_{gt}^{x_0}) - L_r(x_0, c_i^{x_0}) + m) \quad (7)$$

Because, with Expression (6) mentioned earlier, the object class with the lowest integrated cumulative cost is selected as the object class in the pixel position, the first loss is calculated based on Expression (7) that is designed, in the form of hinge loss, in such a manner that the true object class $c_{gt}$ has a cumulative cost that is lower than those of the other object classes $c_i$ by a degree equal to or more than a margin m. The pixel position $x_0$ is a pixel position selected at Step S202. Expression (7) takes the scanning direction r into consideration. For example, automobiles are mostly on the road. Therefore, when the scanning direction is directed from the bottom to the top, it is likely for the object class to transit from "automobile" to "others", while it is less likely for the object class to transit from "automobile" to "others" when the scanning direction is directed from the top to the bottom, for example. By taking the scanning direction r into consideration, such tendencies can be reflected to the training of the transition cost estimating unit 12.

Figure 9:
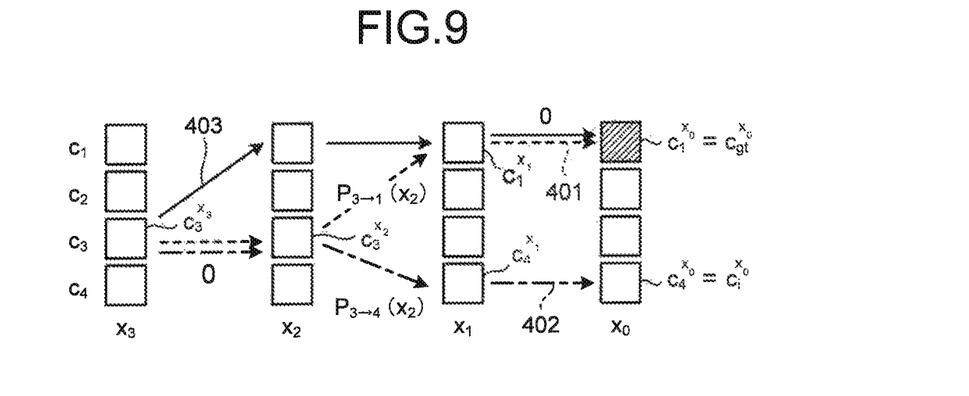
FIG. 9 is a schematic for explaining a first loss.

A derivative with respect to the transition cost is then acquired from Expression (7). One example of the transitions of the object class is illustrated in FIG. 9. In the example illustrated in FIG. 9, the object class $c_1$ is the true object class $c_{gt}$ in the pixel position $x_0$. In this example, consider a path 401 in which a transition from the object class $c_3$ to the object class $c_1$ ($=c_{gt}$) occurs, and a path 402 in which a transition from the object class $c_3$ to the object class $c_4$ ($=c_i$) occurs, in the section from the pixel position $x_3$ to the pixel position $x_0$. The cumulative costs of these paths 401, 402 are acquired in accordance with Expression (3). The cumulative cost of the path 401 can then be described as Expression (8) below, and the cumulative cost of the path 402 can be described as Expression (9) below.

$$L_r(x_0, c_{gt}^{x_0}) = U(x_0, c_{gt}^{x_0}) + U(x_1, c_1^{x_1}) + U(x_2, c_3^{x_2}) + U(x_3, c_3^{x_3}) + P_{r,3 \to 1}(x_2) \quad (8)$$

$$L_r(x_0, c_4^{x_4}) = U(x_0, c_4^{x_0}) + U(x_1, c_4^{x_1}) + U(x_2, c_3^{x_2}) + U(x_3, c_3^{x_3}) + P_{r,3 \to 4}(x_2) \quad (9)$$

Substituting Expression (8) and Expression (9) for Expression (7), if the condition of Expression (10) below is satisfied, the derivative with respect to the transition cost can be acquired as Expression (11) below. If the condition of Expression (10) is not satisfied, the derivative with respect to the transition cost will be all zero.

$$L_r(x_0, c_{gt}^{x_0}) - L_r(x_0, c_4^{x_0}) + m > 0 \quad (10)$$

$$\frac{\partial C'}{\partial P_{3 \to 4}(x_2)} = -1, \frac{\partial C'}{\partial P_{3 \to 1}(x_2)} = 1, \quad (11)$$
$$\frac{\partial C'}{\partial P_{2 \to 1}(x_1)} = 0, \frac{\partial C'}{\partial P_{3 \to 1}(x_1)} = 0$$

In this manner, by retaining the pixel position and the transition resulting in a non-zero derivative, the value of the derivative in the back propagation of errors can be used in the training the transition cost estimating unit 12 at Step S204, which will be described later.

At Step S203, the second loss is calculated. The first loss is calculated without considering the true object class in the pixel position on that path for which the cumulative cost is calculated. Therefore, depending on the transition cost, a path other than the path 401, e.g., a path 403 illustrated in FIG. 9, may be used to reach the true object class $c_{gt}$. In this case, the cumulative cost of the path 403 will be as expressed by Expression (12) below.

$$L_r(x_0, c_{gt}^{x0}) = U(x_0, c_{gt}^{x0}) + U(x_1, c_1^{x1}) + U(x_2, c_1^{x2}) + U(x_3, c_3^{x3}) + P_{r3 \to 1}(x_3) \quad (12)$$

Comparing Expression (12) with Expression (8), it is understood that the third term and the fifth term of the right side are different. Because it is impossible to acquire the transition cost correctly due to these differences, the second loss is calculated at Step S203. In order to calculate the second loss, two conditions need to be satisfied: the first condition is that the true object class $c_{gt}$ in the pixel position $x_0$ and the true object class $c_{qt}$ in the pixel position $x_1$ are both known; and the second condition is that the object class having the lowest cumulative cost in the pixel position $x_1$ matches the true object class $c_{gt}$. For a pixel position that satisfies these two conditions, the second loss is computed using Expression (13) below. Expression (13) is an expression for acquiring the second loss $H_2(x_0, r)$ corresponding to the scanning direction r, in the pixel position $x_0$.

$$H_2(x_0, r) = \sum_{d_i^{x0} \ne d_{gt}^{x0}} \max(0, S(\bullet) - N(\bullet) + m) \quad (13)$$

Figure 10:
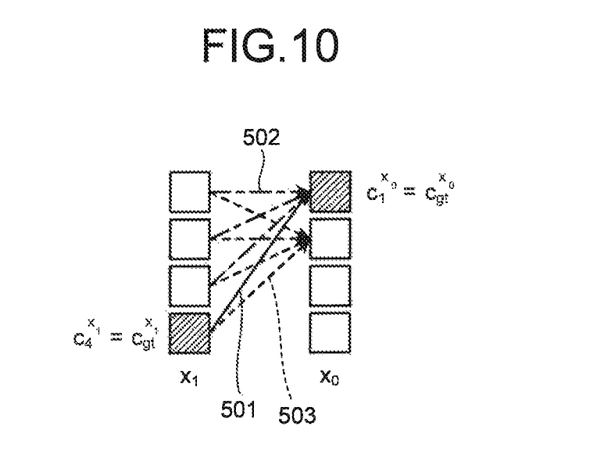
FIG. 10 is a schematic for explaining a second loss.

In Expression (13), $S(\bullet)$ represents a path for reaching the true object class $c_{gt}$ in the pixel position $x_0$ from the true object class $c_{gt}$ in the pixel position $x_1$, as the path 501 illustrated in FIG. 10. $N(\bullet)$ represents other paths, including a group of paths that reach the true object class $c_{gt}$ in the pixel position $x_0$ from the non-true object classes $c_i$ in the pixel position $x_1$, as illustrated as a path group 502 in FIG. 10, and a group of paths that reach the non-true object class $c_i$ in the pixel position $x_0$, as illustrated a path group 503 in FIG. 10. In the example illustrated in FIG. 10, it is possible to describe $S(\bullet)$ and $N(\bullet)$ as Expression (14) and Expression (15), respectively.

$$S(\bullet) = U(x_0, c_{gt}^{x0}) + L_r(x_1, c_{gt}^{x1}) + P_{r4 \to 1}(x_1) \quad (14)$$

$$N(\bullet) = U(x_0, c_{\#}^{x0}) + L_r(x_1, c_{*}^{x1}) + P_{r* \to \#}(x_1) \quad (15)$$

In Expression (15), * and # denote any combination of object classes in the pixel position $x_1$ and the pixel position $x_0$, excluding a combination with the true object classes $c_{gt}$ in both of these pixel positions.

A derivative with respect to the transition cost can be acquired from Expression (13) for acquiring the second loss, in the same manner as for the first loss.

At Step S204, the transition cost estimating unit 12 is trained using both of the first loss and the second loss computed at Step S202, and Step S203. For example, the loss H is generated from the first loss and the second loss, as indicated by Expression (16) below. The transition cost estimating unit 12 is trained in such a manner that the loss H is reduced.

$$H = \sum_r \left\{ \sum_{x \in X_1} H_1(x, r) + \sum_{x \in X_2} H_2(x, r) \right\} \quad (16)$$

The loss H represented in Expression (16) is a combination of the first loss and the second loss. Therefore, using the derivative of the first loss with respect to the transition cost, and the derivative of the second loss with respect to the transition cost, the neural network making up the transition cost estimating unit 12 can be appropriately trained (the network parameters can be updated) with the back propagation of errors.

In the training of the transition cost estimating unit 12, the calculation of the cumulative cost performed by the cumulative cost calculating unit 13 and the process following the flowchart in FIG. 8 are repeated, while sequentially switching the pieces of input training data. As a condition for ending the training, a repetition count that is equal to or more than a predetermined count may be set, or a validation may be performed using validation data, and the training may end when it is determined that the error in the semantic segmentation has converged.

Figure 11:
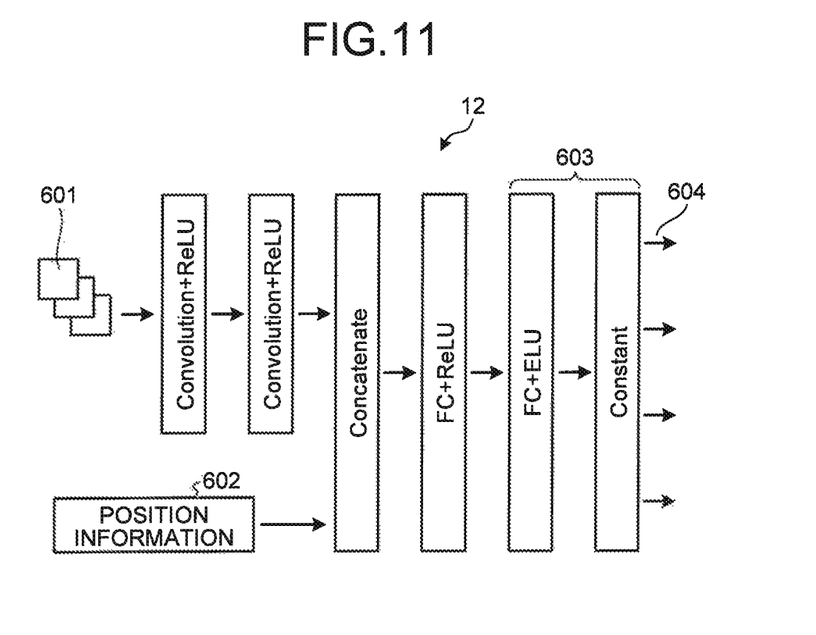
FIG. 11 is a schematic illustrating one example of a specific structure of the transition cost estimating unit.

An example of a specific structure of the transition cost estimating unit 12 will now be explained. FIG. 11 is a schematic illustrating one example of a specific structure of the transition cost estimating unit 12. The transition cost estimating unit 12 illustrated in FIG. 11 is a neural network receiving inputs of image patches 601. The image patches 601 are small image regions in and around the pixel position $x_0$ (pixel of interest). The image patches 601 may be multi-scaled, or color images may be input. Furthermore, in addition to the image patches 601, position information 602 for identifying the position of the image patches 601 (the position of the pixel of interest) in the entire image may be used as an input to the transition cost estimating unit 12.

For example, an image captured by a camera that is onboard an automobile has an uneven distribution, e.g., a large road region being included in the bottom part of the image, and the automobile being included near the center of the image. To make an effective use of this information, it is preferable to use the position information 602 as one of the inputs to the neural network.

In a last stage 603 of the neural network, to make outputs 604 positive values, an exponential linear unit (ELU) and a constant are added. If the last stage 603 is a layer outputting positive values as the outputs 604, those added are not limited to ELU. The outputs 604 are transition costs corresponding to the respective object classes. For example, when there are N object classes, and transition costs are estimated in M directions (when there are M scanning directions), the number of outputs will be N×(N−1)×M.

Figure 12:
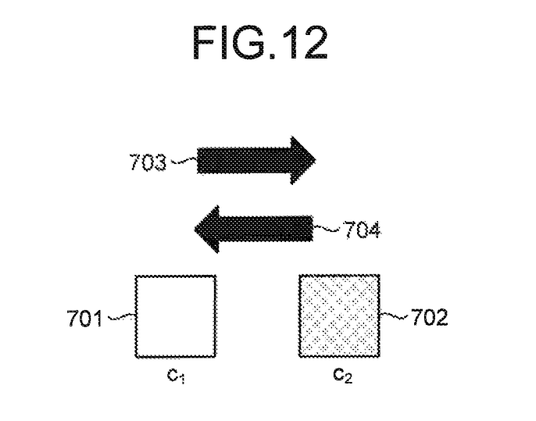
FIG. 12 is a schematic for explaining a relation between scanning directions and a transition cost.

When there are a pixel 701 belonging to the object class $c_1$ and a pixel 702 belonging to an object class $c_2$, as illustrated in FIG. 12, the number of outputs 604 may be reduced to a half by training the transition cost estimating unit 12 in such a manner that the transition cost of a transition from the object class $c_1$ to $c_2$ along a scanning direction 703 becomes equal to the transition cost of a transition from the object class $c_2$ to $c_1$ along a scanning direction 704 that is the reversal of the scanning direction 703. By reducing the number of outputs 604, it is expected that the computational time can be further reduced or the number of pieces of training data to be used in training can be reduced.

Figure 13:
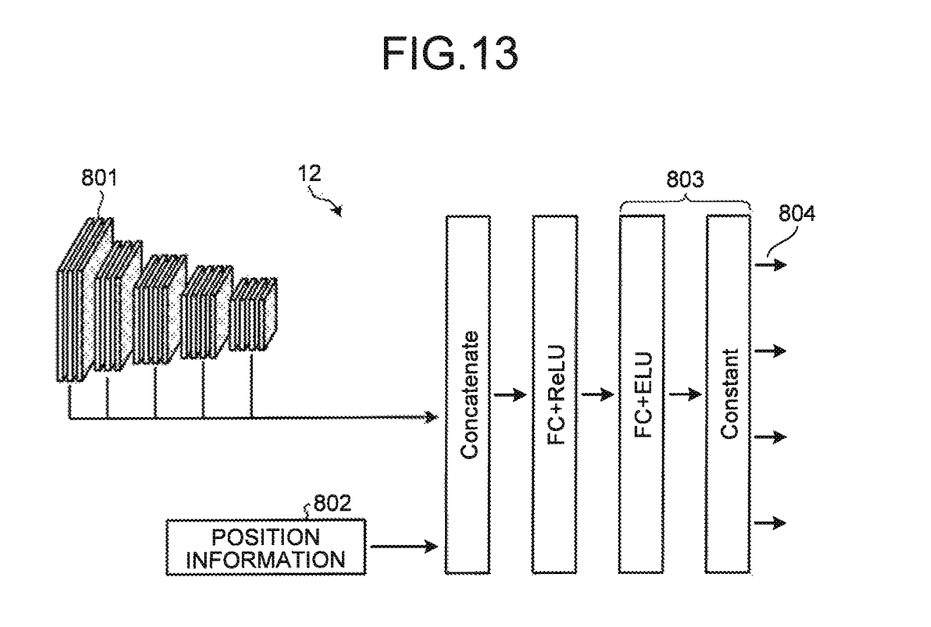
FIG. 13 is a schematic illustrating another example of the specific structure of the transition cost estimating unit.

FIG. 13 is a schematic illustrating another example of the specific structure of the transition cost estimating unit 12. The transition cost estimating unit 12 illustrated in FIG. 13 is configured as a neural network, in the same manner as the example illustrated in FIG. 11, but feature values from another neural network 801 are used as the inputs, instead of the image patches 601 illustrated in FIG. 11. When the neural network disclosed in Badrinarayanan et al. (2017) is used as the neural network 801 serving as the base cost calculating unit 11, for example, the part that encodes the feature values of the neural network (a feature value map computed by reducing the resolution and performing convolution) may be used. In other words, the feature values that are intermediate outputs of the base cost calculating unit 11 may be used as inputs to the transition cost estimating unit 12. It is preferable for the transition cost estimating unit 12 to receive a different feature value for each of the pixel positions, as an input. The neural network disclosed in Badrinarayanan et al. (2017) can use multi-scale information ranging from a low resolution to a high resolution.

The feature values with position information 802 for identifying pixel positions in the entire image may be input to the transition cost estimating unit 12 in the same manner as the example illustrated in FIG. 11. Furthermore, in addition to these examples, information of the location or the region where the image is captured, and information of the time or the weather of the time at which the image is captured, or information of the type of the camera may be used as the inputs of the transition cost estimating unit 12. Furthermore, an RGBD image, which is an addition of a depth to the RGB image, or a depth-only image, an infrared image, or the like may also be used. The last stage 803 of the neural network outputs the transition costs of the object classes as the outputs 804, in the same manner as in the example illustrated in FIG. 11.

Figure 14:
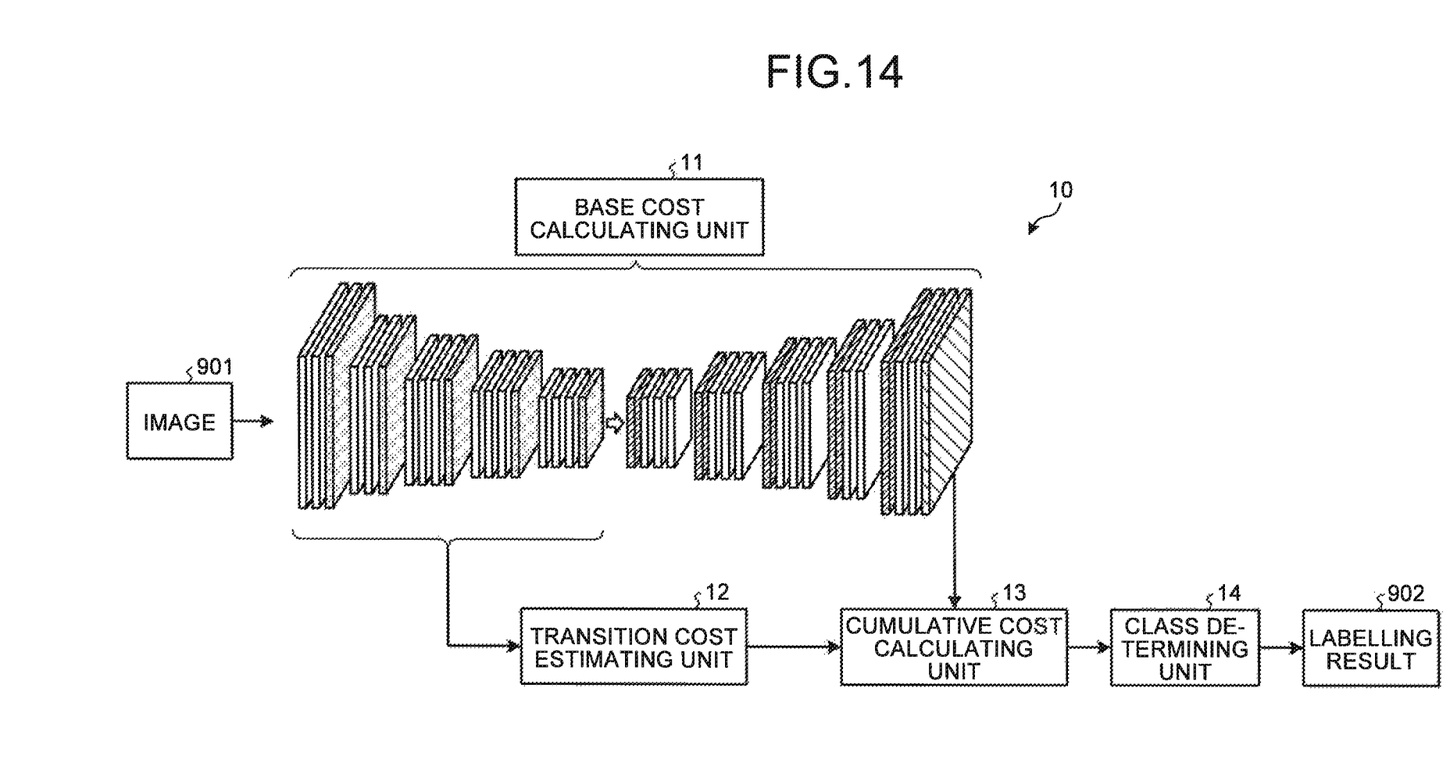
FIG. 14 is a schematic illustrating an exemplary configuration of the object region identifying apparatus using the transition cost estimating unit having the structure illustrated in FIG. 13.

FIG. 14 is a schematic illustrating an exemplary configuration of the object region identifying apparatus 10 using the transition cost estimating unit 12 having the structure illustrated in FIG. 13. The object region identifying apparatus 10 illustrated in FIG. 14 causes the base cost calculating unit 11 to calculate the base costs of the respective object classes, in each of the pixels of an input image 901. Because global information is used, the transition cost estimating unit 12 estimates a transition cost of a transition between the object classes using the feature values that are the intermediate outputs of the base cost calculating unit 11. The cumulative cost calculating unit 13 then calculates the cumulative costs of the respective object classes, in each of the pixels, using the outputs of the base cost calculating unit 11 and the outputs of the transition cost estimating unit 12. When there are a plurality of scanning directions, the cumulative cost calculating unit 13 calculates an integrated cumulative cost by calculating the sum of the cumulative costs of the respective scanning directions. The class determining unit 14 then determines the object class in each of the pixels of the input image 901 using the outputs of the cumulative cost calculating unit 13, and then outputs a labelling result (semantic segmentation result) 902 corresponding to the input image 901.

According to Japanese Patent Application Laid-open No. 2008-217706 and Shuai Zheng et al. (2015), the penalty (pairwise term) estimated thereby is calculated by inputting an RGB representation of a pixel value or a distance of a pixel position to a gaussian function, adjusting the value with the standard deviation or with the weights of a plurality of gaussian functions, and by finally multiplying compatibility that is an established weight between the object classes, the weight being established independently of the image features. However, because the weight between the object classes is correlated with the image features, the penalty estimated by these conventional approaches does not have a sufficient representational capability. By contrast, the transition cost estimating unit 12 in the object region identifying apparatus 10 according to the embodiment has a sufficient representational capability because the transition cost estimating unit 12 automatically re-learns the feature values, for the input image patches or the feature values that are the intermediate outputs of the neural network, and estimates the transition cost (corresponding to the penalty) directly from the re-learned feature values. In other words, in this embodiment, because it is not necessary to separate the compatibility as is in the conventional approaches, and because not only image patterns but also the pixel values are taken into consideration at the same time, transition costs can be estimated more appropriately, compared with those achieved with the conventional approaches.

The object region identifying apparatus 10 according to the embodiment described above can be implemented by using a general-purpose computer device as basic hardware, for example. In other words, the functions of the units included in the object region identifying apparatus 10 described above can be implemented by causing one or more processors mounted on the general-purpose computer device to execute a computer program. At this time, the object region identifying apparatus 10 may be implemented by installing the computer program on the computer device in advance, or by storing the computer program in a storage medium such as a compact read-only memory (CD-ROM) or distributing the computer program over a network and installing the computer program on the computer device as appropriate.

Figure 15:
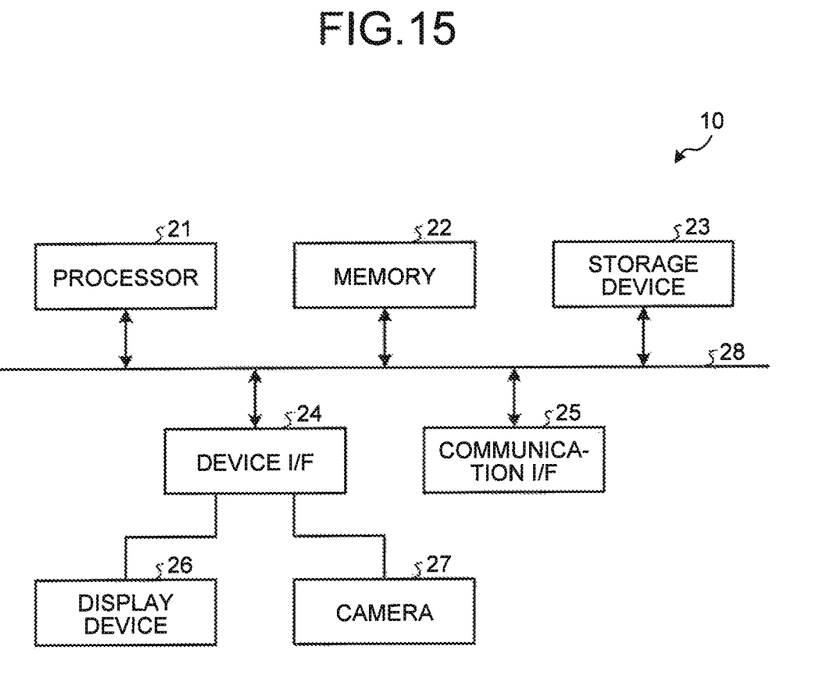
FIG. 15 is a block diagram illustrating an exemplary hardware configuration of the object region identifying apparatus according to the embodiment.

FIG. 15 is a block diagram illustrating an exemplary hardware configuration of the object region identifying apparatus 10 according to the embodiment. The object region identifying apparatus 10 has a hardware configuration of a general computer including, for example, a processor 21 such as a central processing unit (CPU), a memory 22 such as a random access memory (RAM) and a ROM, a storage device 23 such as a hard-disk drive (HDD) or a solid-state drive (SSD), a device interface (I/F) 24 for connecting devices such as a display device 26, e.g., a liquid crystal panel, and a camera 27 for capturing images, a communication I/F 25 for communicating with external of the device, and a bus 28 connecting these elements, as illustrated in FIG. 15.

When the object region identifying apparatus 10 has a hardware configuration such as that illustrated in FIG. 15, the object region identifying apparatus 10 can implement the functions of the units described above (the base cost calculating unit 11, the transition cost estimating unit 12, the cumulative cost calculating unit 13, and the class determining unit 14 (the updating unit 15)), by causing the processor 21 to read a computer program stored in the storage device 23 or the like, and to execute the computer program using the memory 22, for example.

Some or the whole of the functions of the units included in the object region identifying apparatus 10 may also be implemented using a dedicated hardware (not a general-purpose processor but a dedicated processor) such as an application specific integrated circuit (ASIC) or a field-programmable gate array (FPGA). Furthermore, the functions of the units described above may be implemented by using a plurality of processors.

The object region identifying apparatus 10 according to the embodiment may also be provided as an object region identifying system by using a plurality of computer devices and implementing the functions of the units described above on the computer devices in a distributed manner. Furthermore, the object region identifying apparatus 10 according to the embodiment may also be a virtual machine operating on a cloud system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object region identifying apparatus for identifying to which one of a plurality of predetermined object classes each pixel of an image belongs to label the pixel with an object type, the object region identifying apparatus comprising:
   a memory configured to store a computer program; and
   a processor coupled to the memory and configured to execute the computer program to:
   calculate base costs of the respective object classes in each of the pixels;
   estimate a transition cost accrued when a transition between the object classes occurs between adjacent pixels in the image;
   calculate cumulative costs of the respective object classes in each of the pixels by sequentially adding the base cost and the transition cost for the respective object classes along a scanning direction set on the image; and
   determine the object class of each of the pixels based on the corresponding cumulative cost.

2. The object region identifying apparatus according to claim 1, wherein the processor is further configured to execute the computer program to:
   estimate the cumulative cost calculating unit estimates the transition cost for each of the object classes and for each of a plurality of the scanning directions set on the image, and
   determine the class determining unit determines an object class having a lowest integrated cumulative cost in each of the pixels as the object class of the pixel, among the object classes, the integrated cumulative cost being resultant of calculating a sum of the cumulative costs calculated for the respective scanning directions.

3. The object region identifying apparatus according to claim 1, wherein the processor is further configured to execute the computer program to:
   calculate the cumulative cost using dynamic programming; and
   determine the object class using the dynamic programming.

4. The object region identifying apparatus according to claim 1, wherein the processor is further configured to execute the computer program to:
   train the computer program with training data so as to estimate a transition cost in each of the pixels in such a manner that the cumulative cost is minimized for a true object class.

5. The object region identifying apparatus according to claim 4, wherein the computer program includes a neural network.

6. The object region identifying apparatus according to claim 1, wherein the processor is further configured to execute the computer program to:
   receive an input of a small image region in and around a pixel of interest in the image; and
   estimate and output the transition cost in the pixel of interest.

7. The object region identifying apparatus according to claim 1, wherein the processor is further configured to execute the computer program to:
   receive an input of a feature value calculated by another neural network; and
   estimate and output the transition cost in a pixel of interest in the image.

8. The object region identifying apparatus according to claim 6, wherein the processor is further configured to execute the computer program to:
   receive an input of position information for identifying the pixel of interest in the image.

9. An object region identifying method for identifying to which one of a plurality of predetermined object classes each pixel of an image belongs to label the pixel with an object type, the object region identifying method comprising:
   calculating base costs of the respective object classes in each of the pixels;
   estimating a transition cost accrued when a transition between the object classes occurs between adjacent pixels in the image;
   calculating cumulative costs of the respective object classes in each of the pixels by sequentially adding the base cost and the transition cost for the respective object classes along a scanning direction set on the image; and
   determining an object class of each of the pixels based on the corresponding cumulative cost.

10. A computer program product having a non-transitory computer readable medium including programmed instructions, wherein the instructions, when executed by a computer, cause the computer to:
   calculate base costs of the respective object classes in each of the pixels;
   estimate a transition cost accrued when a transition between the object classes occurs between adjacent pixels in the image;
   calculate cumulative costs of the respective object classes in each of the pixels by sequentially adding the base cost and the transition cost for the respective object classes along a scanning direction set on the image; and
   determine an object class of each of the pixels based on the corresponding cumulative cost.

* * * * *